Figure 1:
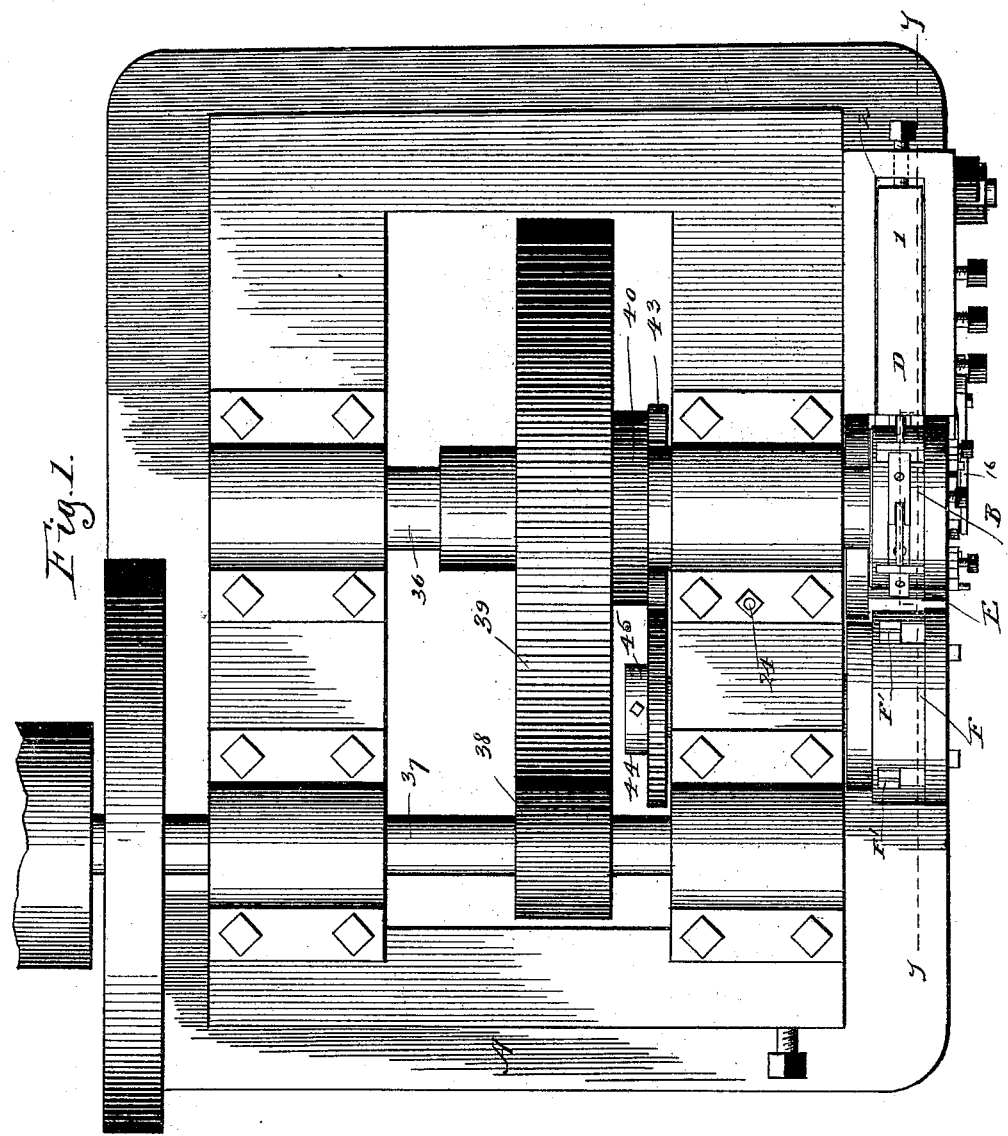

(No Model.) 6 Sheets—Sheet 1.

F. ALLISON.
MACHINE FOR MAKING CUT NAILS.

No. 394,903. Patented Dec. 18, 1888.

Witnesses,
L. F. Mann,
Edwin Corbin.

Frank Allison, Inventor;
By Uhle & Reed
Att'ys.

(No Model.) 6 Sheets—Sheet 2.
F. ALLISON.
MACHINE FOR MAKING CUT NAILS.
No. 394,903. Patented Dec. 18, 1888.
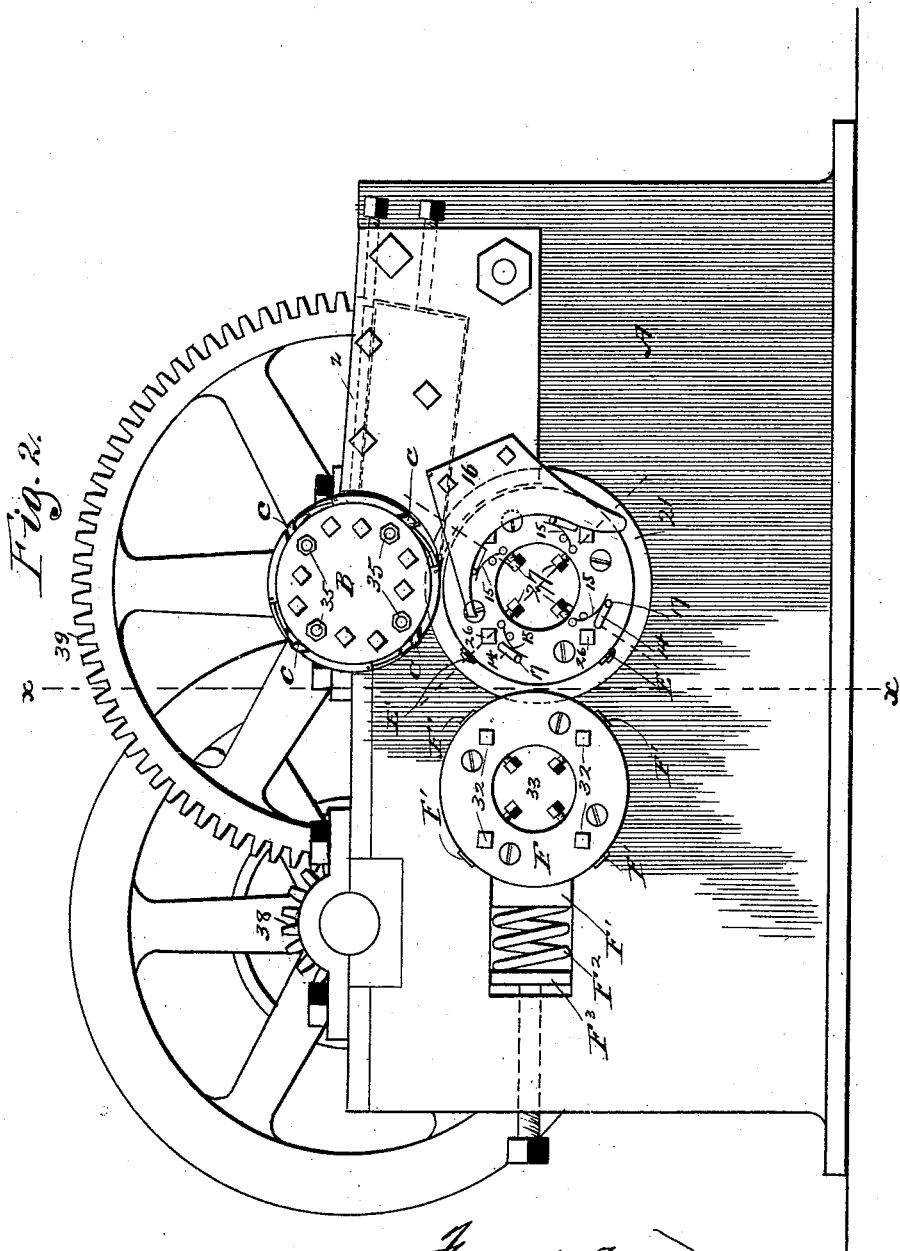

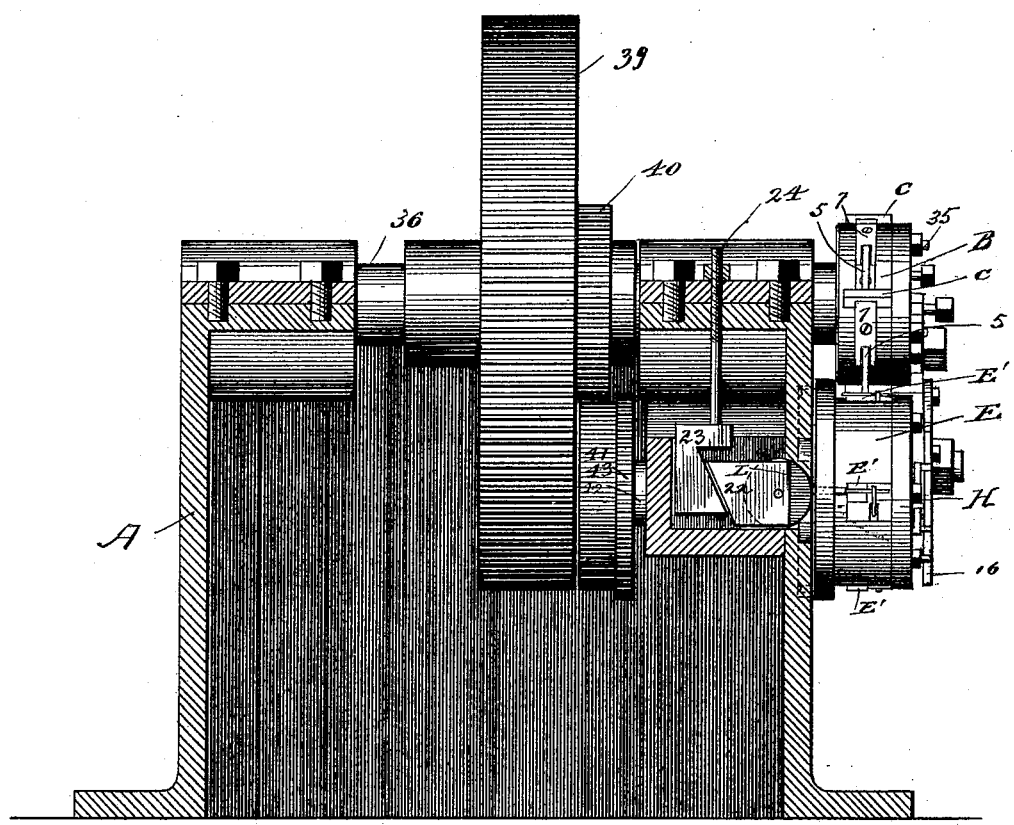

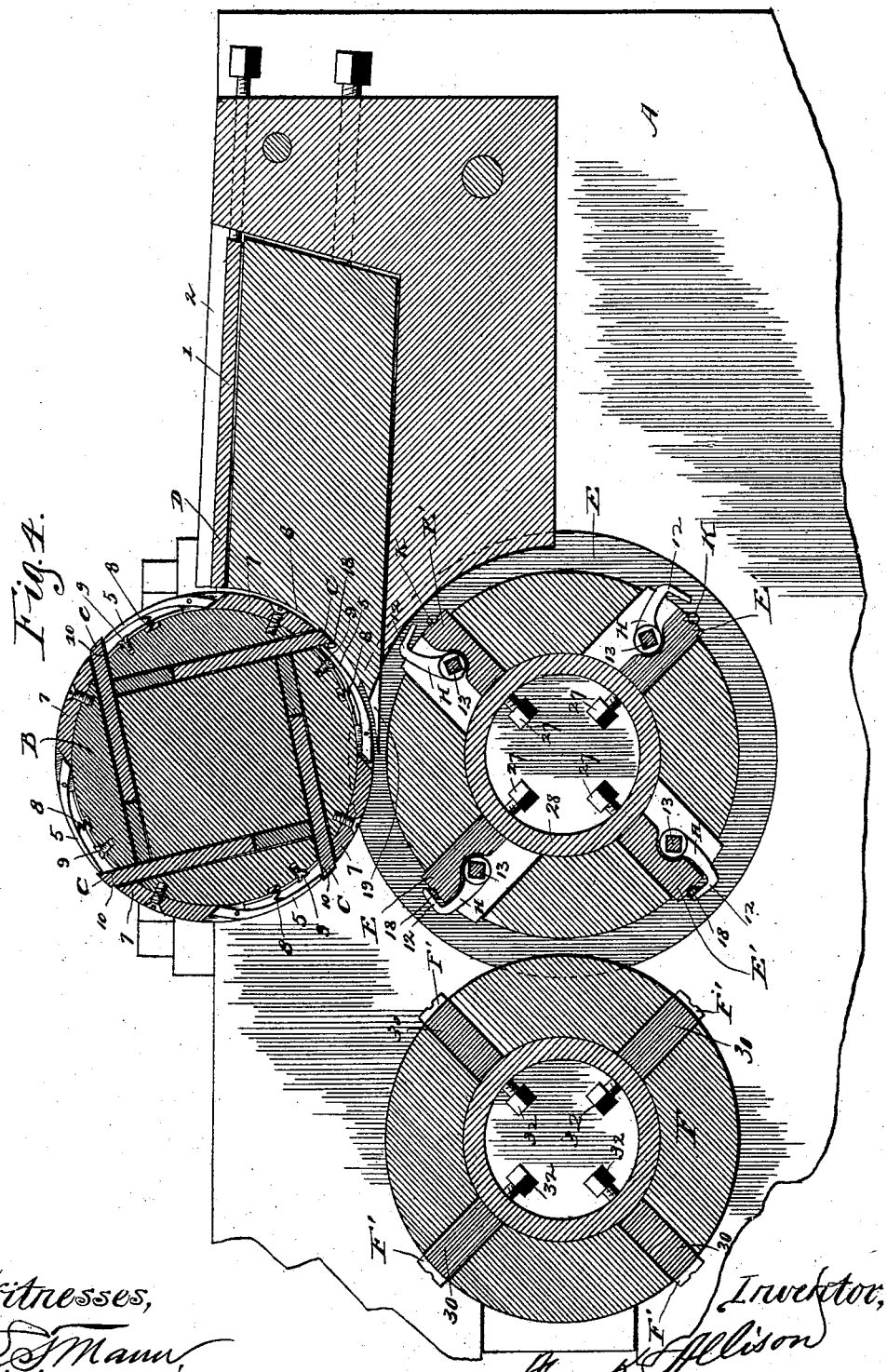

(No Model.) 6 Sheets—Sheet 5.
F. ALLISON.
MACHINE FOR MAKING CUT NAILS.
No. 394,903. Patented Dec. 18, 1888.
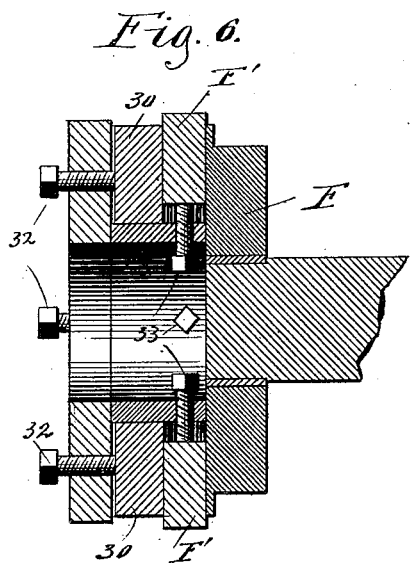
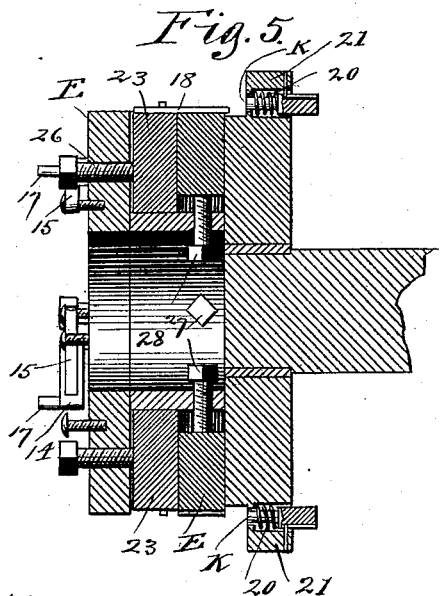
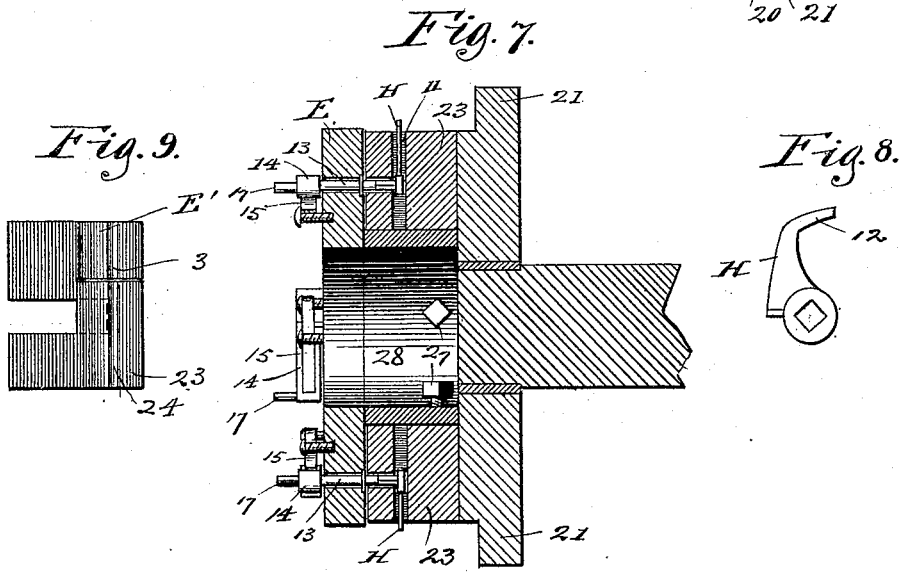
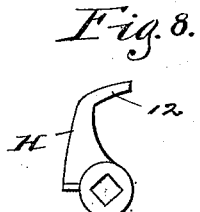
Witnesses,
L. F. Mann,
Edwin Corbin.
Frank Allison Inventor,
By Wile & Reed Attys

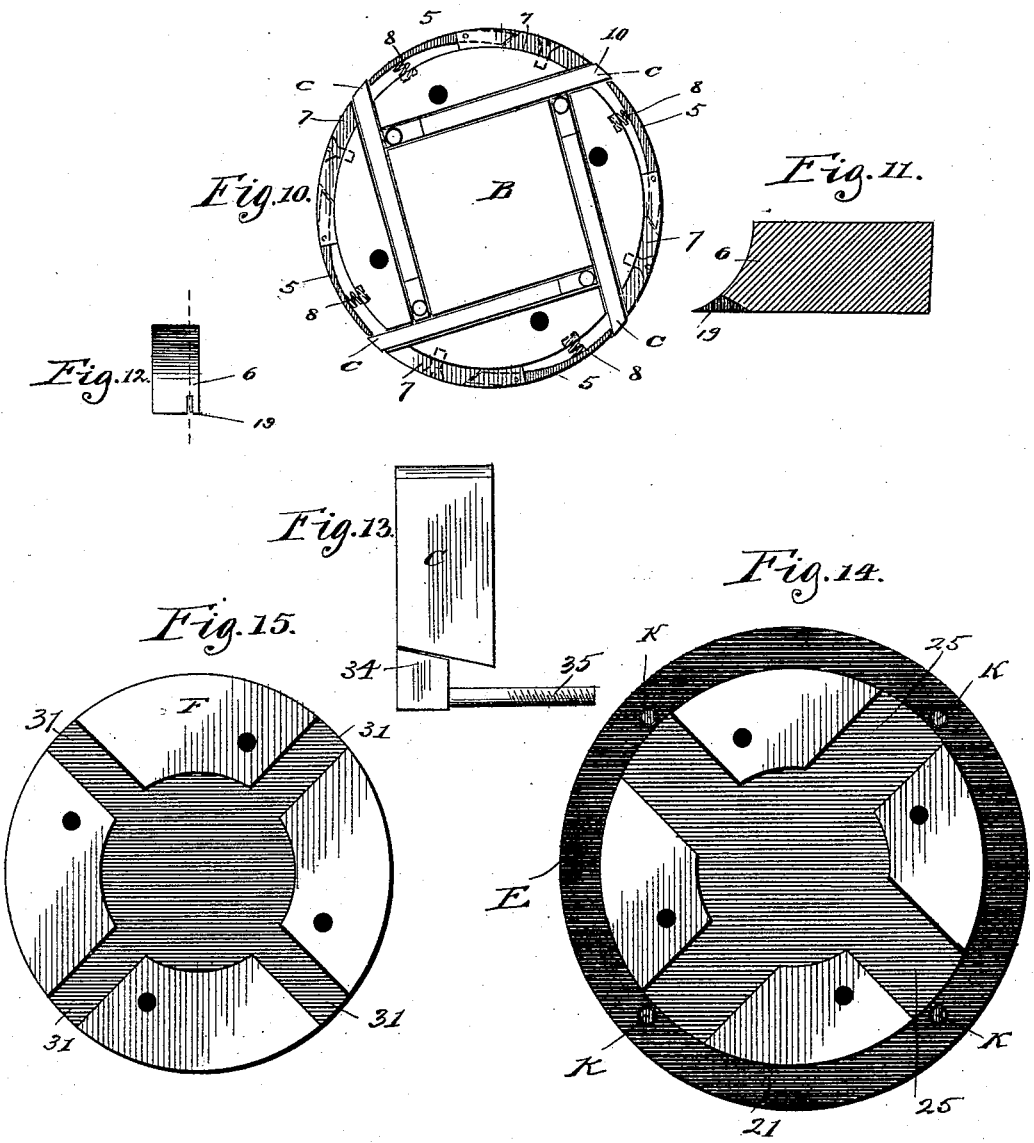

UNITED STATES PATENT OFFICE.

FRANK ALLISON, OF GRAND CROSSING, ASSIGNOR TO GUSTAVE M. GREENE-BAUM AND FRANK G. HOLTON, OF CHICAGO, ILLINOIS.

MACHINE FOR MAKING CUT NAILS.

SPECIFICATION forming part of Letters Patent No. 394,903, dated December 18, 1888.

Application filed October 25, 1887. Serial No. 253,310. (No model.)

*To all whom it may concern:*

Be it known that I, FRANK ALLISON, a citizen of the United States, residing at Grand Crossing, in the county of Cook and State of Illinois, have invented certain new and useful Improvements in Nail-Machines, of which the following is a specification.

This invention relates to improvements in machines for producing nails, and more particularly to machines wherein cut nails are produced by first cutting the nail-blanks from a nail-plate, and then heading up such nail-blanks in order to complete the nails. Certain features herein involved may, however, be employed to advantage in machines for producing other varieties of nails, it being understood that where such features are applicable to other classes of nail-machines the gripping or clamping dies can be shaped in conformity with the shape of nail-blank.

The object of my invention, generally stated, is to facilitate and cheapen the production of cut nails and to provide simplified and efficient means whereby the nails can be produced with greater certainty and rapidity, thereby reducing the time, labor, and cost of their manufacture and rendering the nail-machine a greater commercial success.

To the attainment of the foregoing and other useful ends my invention consists in matters hereinafter described, and particularly pointed out in the claims.

A prominent feature of my invention consists in providing, in connection with a revolving clamping-die, a nipper, which is carried with the revolving die and adapted for temporarily holding thereon a nail-blank, so that from the moment at which the nail-blank is delivered to such die until the moment at which such revolving die is brought into register with a corresponding revolving die the nail-blank will be effectively held in place, it being understood that when the two dies, or "half-dies," as they may be indifferently termed, are in register, so as to firmly clasp the blank between them, the blank will be headed up by a heading tool or die. The nipper is automatically operated to close toward the die at a moment proper for engaging and holding the blank thereon, and preferably retains its hold upon the blank until after the heading has been completed and the finished nail is brought by the revolving die to a point suitable for its discharge. In this way the nipper, which is carried with the revolving die, alternately opens and closes relatively to the clamping-die face during each revolution on the part of the die.

As a further feature of improvement the two revolving clamping-dies are employed in conjunction with a revolving cutter, which latter acts in connection with a stationary cutter to sever a cut-nail blank from a nail-plate, and from such point of cut to carry the nail-blank forward and deliver it to one of the revolving dies, the said two revolving dies being respectively attached to one and the other of a pair of rotary heads, which serve as vehicles for causing their revolution about the axes of the heads, while the cutter is attached to a third head mounted in such position relatively to one of the die-carrying heads that as soon as the cutter has severed a nail-blank from the nail-plate it can then serve as a means for the transfer of the nail-blank from the point of cut to one of the revolving dies, which during the operation of the machine arrives at the point of delivery just in time to receive the nail-blank from the point at which the latter leaves the cutter. It is understood that the dies and cutters may and in practice will be multiplied, in order to produce nails with great rapidity, and that the number of nippers may be increased in accordance with the number of dies employed.

A further feature of improvement consists in constructing the clamping-die so that the die-face, which is designed for rounding up a certain portion of the blank, can be readily removed and ground without necessitating the removal of such remaining portion of the die-face as may be present merely as a clamping or holding face, to which end the rotary head is provided with a die block or backing having a groove for receiving such portion of the nail-blank as is not to be rounded up, and a clamping and rounding-up die proper is fitted to said grooved block and provided with a grooved face adapted for rounding up such portion of the blank as may require rounding, and having its groove arranged to lie in alignment with and as a continuation of the groove of the block or backing.

As a further feature of improvement, the rotary support for one of a pair of revolving clamping-dies is provided with a movable heading tool or die having a projecting portion arranged to normally project in a path that is intersected by an idler wheel or roll, so that at the moment the blank is firmly gripped between the two clamping-dies the heading-die will be forced forward by the opposition of the idler wheel or roll, thereby dispensing with the necessity of mechanism for operating the idler wheel or roll, which at all times stands as an abutment in the path of the rear end or rear projecting portion of the heading-die or die-stock ready to perform its allotted function.

A further feature of improvement consists in forming the rotary head carrying one or more clamping-dies of a greater diameter than the rotary head carrying one or more cutters so arranged with relation to a stationary knife and to the die-carrying head that as soon as a cutter upon its allotted revolving head has acted to sever a nail-blank from the nail-plate it shall act to carry forward the nail-blank and deliver the same to the die on the rotary nail-carrying head, whereby while the cutter-head and the die-head are both driven at the same rate of speed, and the die during each revolution on the part of its head is brought at a proper moment into position to receive the nail-blank as the latter drops from the revolving cutter, the die upon the perimeter of its allotted head will be carried faster than the revolving cutter, and hence upon receiving the nail-blank will instantly carry the same ahead of the cutter, and thus avoid all possible interference of the cutter with the nail-blank. This feature is also particularly serviceable in conjunction with the spring nail-blank holder and ejector, which at a proper moment acts to deliver the nail-blank from the revolving cutter to the revolving die.

A further feature consists in mounting at least one of the two die-carrying heads in or upon a self-adjustable bearing backed by some suitable spring resistance, in which way, while two dies, respectively on one and the other of the two heads, are in register, the nail-blank will be gripped with suitable force for holding it against the action of a heading-tool and such grip retained upon the nail-blank at the time when the two dies are about passing a right line joining the axes of their two rotary heads. This prolongation of the grip serves to cause the nail-blank to be held for such length of time as will insure the proper heading up of the same.

A further feature of improvement consists in a particular mode of arranging upon the rotary cutter-head a spring plate or finger, which, as hereinafter set forth, serves first as a gage for determining the width of nail-blank cut from the nail-plate, next as a spring-holder for holding the nail-blank during the transmission of the latter from the point of cut to the clamping-die, and next as an ejector for effecting the delivery of the nail-blank from the rotary cutter-head to the clamping-die, and to such end the said spring-finger, which is arranged in advance of the cutter carried by a rotary head, is pivoted at one end upon a bearing raised somewhat from the cylindric perimeter of the head, and arranged so that the free end of the spring-finger shall normally lie adjacent to the cutting-edge of the cutter, which projects to some extent out from the cylindric surface of the head. In this way the free end of the spring-finger can be permitted while standing out from the head to normally lie close up to the cutter on the rotary head, for the reason that, the opposite end of the finger being pivoted at a point likewise stationed out from the perimeter of the head, the arc described by the free end of the finger when it is pushed back by the nail-plate toward the head will not crowd it against the projecting body portion of the cutter.

Further features of improvement consist in certain details and combinations of parts, hereinafter set forth, and all particularly specified in the claims.

In the accompanying drawings, Figure 1 represents a top plan view of a nail-machine embodying the principles of my invention. Fig. 2 is a side elevation of the same. Fig. 3 is a transverse sectional elevation taken on the line $x$ $x$, Fig. 2. Fig. 4 is a longitudinal sectional elevation taken on the line $y$ $y$, Fig. 1. Fig. 5 represents a central longitudinal section taken through the die-carrying head E and a portion of the shaft therefor. Fig. 6 is a like sectional view of the rotary die-carrying head F. Fig. 7 is a view of the rotary die-carrying head similar to Fig. 5, but in a different plane, so that while in Fig. 5 the dies E' and the heading tools or dies K are shown said devices are not visible in Fig. 7, which illustrates, however, nippers H, for temporarily holding the nail-blanks upon said dies E'. Fig. 8 represents one of the nippers detached from the head. Fig. 9 represents the face of what may in general terms be understood to consist of a clamping-die, but which, for certain purposes of the invention, involves a sectional die composed of a clamping and rounding-up die portion and a block or backing to which said die is fitted. Fig. 10 is an end view of the rotary head B, provided with cutters and spring-fingers, the end plate usually fastened on such head being omitted for convenience of illustration. Fig. 11 is a longitudinal section through the block, which is adapted to provide the curved guide 6, and which in Fig. 4 is set adjacent to the rotary cutter-head, so as to provide between such head and the guide-wall 6 a passage, wherein the nail-blanks are carried from the point of cut to the point where they are delivered to the rotary die-carrying head E.

Fig. 12 is an end view of the block of Fig. 11, and further illustrates the notch 19, formed in the lower end of the curved guide-wall 6. Fig. 13 is a detail representing one of the revolving cutters C and a block for adjusting the same. Fig. 14 is an end view of the rotary head E with the end plate and internal collar removed. Fig. 15 is a like view of the rotary head F.

A indicates the main frame, which is understood to be provided with bearings appropriate for the several operative members of the machine, and otherwise suitably constructed so as to involve the features of strength and solidity that are desirably present in nail-machines.

The nail-blanks are to be cut in a rapid succession from a nail-plate by the conjoint action of stationary and revolving knives or cutters, for which purpose the rotary head or carrier B is provided with a peripheral series of knives, C, which during the rotation of the head are successively brought into co-operative relationship with a fixed knife or cutter, D.

It is understood that in practice a nail-plate of width proportional to the desired length of nail-blank will be mechanically fed up to the point of cut. The representation of a device for thus feeding forward the nail-plate is herein omitted, it being simply necessary to observe that while any suitable arrangement of feed device can be employed the line of feed should be in a plane substantially coincident with and just above the top side of the block or plate 1, herein shown adjustably held within a suitable guideway, 2, in the main frame, and adapted to provide a knife or cutting-edge at its end which stands in opposition to the perimeter of the rotary head or carrier B.

The gripping-dies for holding the nail-blanks at times allotted for heading up the same are carried by a couple of rotary heads or carriers, E and F, the former being provided with one or more but desirably with a plurality of dies, E', and the latter with a corresponding number of dies, F'. These die-carrying rotary heads E and F are mounted below the field of operation of the rotary knife-carrier and arranged so that during operation the dies of the revolving heads E and F shall be successively brought into matching positions for momentarily gripping or clamping the nail-blanks. Thus when two clamping or gripping dies, respectively on one and the other of such heads, are brought into position to match or register together, they will in passing a right line between the centers of rotation of the two heads serve to close upon and momentarily hold the nail-blank with a firm grip, and hence during such period of grip upon the blank hold and permit the same to be headed up.

The rotary head or knife-carrier B is herein arranged directly over the rotary die-carrying head E, and the stationary cutter is arranged with relation to the carrier B to effect the cut at a point sufficiently remote from the highest point of the rotary head E to render it necessary for the nail-blank to be carried round with the rotary carrier B about one-quarter of a revolution on the part of the latter, in order to bring the nail-blank from the point of cut to the point where it may be properly delivered to the rotary die-carrying head E. The rotary knife-carrier B is utilized as a means for effecting the transfer of the blank from the point of cut to the rotary die-carrying head E, and to such end the said rotary head or carrier B, which may be provided with one or more knives, but which is herein desirably equipped with a plurality of knives, is further provided with a peripherally-arranged set of pivoted spring-fingers, 5, which during the passage of the nail-blanks from the points of cut to the rotary die-carrying head E serve to maintain the blanks against a curved guide-wall, 6, and which at the instant the blanks pass the lower terminal of such curved guide-wall further serve to deliver or assist in delivering the blanks to said rotary die-carrying head. The spring or spring-controlled fingers 5 are disposed at intervals about the rotary carrier B, and set at such points that each finger shall stand in advance of one of the knives C, with its free end standing next adjacent to its allotted knife. The rotary head B is provided with an annular peripherally-arranged series of rib-sections, 7, set at intervals apart around the perimeter of the head, so as to provide in effect about the head an annular rib interrupted at intervals by gaps. A cutter, C, projects from the head at one end of each of said gaps, while at the opposite end of each gap is pivoted one of the spring-fingers 5. These rib-sections 7 constitute pivot-bearings raised from the perimeter of the head, and serving to hold the pivots for the spring-fingers out from said perimeter of the head, in addition to which said ribs also provide backings for such portions of the rear sides of the cutters C as may project from the head. This mode of pivotally supporting the fingers 5 permits them to normally stand substantially concentric with, but to some extent out from, the general cylindric perimeter of the head, with the free end of each finger normally standing close up to the acting edge of the cutter, from which position the finger can be swung toward the head without crowding against the cutter, and hence depressed into the gap at such time as the forward end of the nail-plate is pushed forward against such finger. Springs 8 are herein arranged between the fingers 5 and the head, so as to cause such fingers to normally stand out to the desired extent, but at the same time to admit of the fingers being forced back by the nail-plate in order to permit the cutters C to cut nail-blanks of desired width from the nail-plate.

Under such arrangement the nail-plate, when fed forward and to the rotary head or knife-carrier B, will strike one of the spring-fingers 5, and depress the same to an extent proportionally to the extent that the forward end of the nail-plate can be projected beyond the point of cut. The extent to which the spring-finger can be thus depressed, and the consequent projection on the part of the nail-plate beyond the point of cut, determines the width of the subsequently-severed blank, and hence, in order to predetermine the width of nail-blank, adjustable stops or set-screws 9 are secured in the head B at points under the spring-fingers 5. In this way, by adjusting the stops 9 in directions radial to the center of the head B, the extent to which the fingers can be forced back by the nail-plate will be determined.

As soon as a nail-blank is severed by the conjoint action of the fixed cutter and one of the revolving cutters, the revolving cutter will serve to carry the blank along a passage formed between the head B and the curved guide 6, which is formed at one end of a block adjustably held in the main frame of the machine. During such transfer of the nail-blank from the point of cut to the rotary head E, the spring-finger which remains depressed by reason of the interposition of the nail-blank between such finger and the guide 6 will serve to steady the nail-blank and cause it to maintain its place against the shank or body portion of the cutter, which has, as aforesaid, just operated to sever the blank, it being observed that at such period the nail-blank will lie flat up against the front side of the end portion, 10, of the body of the cutter, which projects from the head, as in Fig. 4, wherein a nail-blank is shown in the act of being transferred from the point of cut to the rotary head E. It will also be observed that the axes of the heads B and E are parallel, and that since the width of each cutter C corresponds to the length of the severed nail-blank the body of the cutter will during the transfer of the nail-blank from the point of cut to the rotary die-carrying head E bear against the entire length of the blank, and thereby keep the same parallel with the axis of the rotary die-carrying head E, and hence parallel with the groove of any one of the dies E′, which are all grooved in lines parallel with the axis of the head by which they are carried. There will, therefore, during such period of transfer be no tendency on the part of the cutter to move one end of the blank faster than the other, and hence no devices for righting or bringing the nail-blank into position parallel with the grooves of dies 3 will be necessary.

When the nail-blank reaches the lower terminal of the curved guide-wall 6, it will make a partial turn over the end of the block G at the lower terminal of such guide and will drop flat into the groove of one of the dies E′, which action on the part of the nail-blank is insured by the spring-finger acting as an ejector.

By reason of the arrangement of the spring-controlled ejector-finger 5, or what would be the same thing, a spring-finger, the nail-blank will be ejected in a direction radially from the head, and the ejector will not drag the nail forward and in advance of the die, this improved action of the ejector being due to attaching one end of the ejector to a projection on the periphery of the head, so that the ejector will normally lie substantially concentric with such periphery in place of being normally tangential thereto, as in United States Letters Patent No. 375,302.

In order to bring the dies of the rotary head F into co-operative relationship with the dies of the rotary head E, and at the same time simplify the general arrangement by placing the rotary carrier B in relationship to the rotary head E, substantially as shown, it is of course necessary to mount the rotary heads B and F at a proper distance apart, and this renders it necessary for a nail-blank delivered from the rotary head B to a die on the rotary head E to be transferred from such point of delivery to the point where the die will be brought into register with a like die on the rotary head F. During the transfer of the nail-blank from one of such points to the other it is highly essential to provide means for gripping the nail-blank as soon as it has left the guide 6 and for holding it in or on the die of head E until such die has been brought into register with an opposing die of the head F. It is also desirable during the time when the two dies are separating to still cause the nail-blank to maintain its position on one of such dies, and to so hold the nail-blank until it arrives at a point proper and convenient for its discharge. As a means for attaining such desired ends, the rotary head E is provided with a set of automatically-operating nippers, H, corresponding in number to the number of dies with which such rotary head is provided. These nippers (see particularly Figs. 4 and 7) are arranged for engaging the nail-blanks just after the latter have left the curved guide 6, and for holding the nail-blanks upon the dies of the head E so long as may be necessary.

The nippers herein shown consist of vibratory jaws or fingers pivoted eccentric to the axis of the head E, and desirably pivotally supported within recesses 11 in the head, and arranged so that their outer free curved ends, 12, may project out from the periphery of the head in a manner to engage and hold the nail-blanks upon the half-dies 3 at proper times during the rotation of the head. Under the arrangement herein shown one of these nippers will engage upon a nail-blank as soon as the latter has left the guide 6 and has been received by one of the dies E′, the nippers continuing to hold the nail-blank until after the same has been headed up and until the now finished nail has been carried to a point about under the head E, at which point the nipper releases its hold upon the nail, so that the same may drop from the head. These nippers can obviously be operated at proper moments by a variety of mechanical expedients. As an illustration of a simple and efficient way of operating the nippers, their pivots 13 are arranged parallel with the axis of the rotary head E and extended out from one end of the head. The extended ends of said pivots are provided with arms 14, arranged to swing opposite the end of the head and adapted to serve as cranks for turning the pivots upon which the nippers are fixed. The nippers are caused to close upon the nail-blanks by suitably-arranged springs, which, for example, can be applied as in Fig. 2, wherein springs 15 are secured to the end of the rotary head E, and applied to the arms 14 in a manner to cause the nail-blank-engaging ends 12 of the nippers to normally close upon the half-dies 3. The nippers can, however, be positively opened or swung away from the half-dies 3 by a cam, I, formed by the curved edge of a plate, 16, that is secured to the main frame in position to bring its curved or cam portion I in front of the end of head E, and in such position that during the rotation of the head studs 17 on the arms 14 of the nipper-pivots will for a portion of each revolution of the head be brought against the cam I, which serves to swing the arms 14 in a direction to open the nippers. The cam I is so timed or arranged that at a moment proper for causing a nipper to close upon a nail-blank on one of the dies E' the stud 17 allotted to such nipper will clear the upper end of cam I, thus permitting the spring for such nipper to swing the nipper in a direction to cause it to engage and hold the nail-blank. The spring will then be free to hold the nipper upon the nail-blank until the stud 17 allotted to such nipper is again opposed by the cam I, at which last-mentioned juncture the nipper will be swung by the cam out and away from the finished nail, and hence allow the nail to drop down from the rotary head.

In Fig. 4 two of the nippers are therein shown closed, with each holding a nail-blank, 18, upon one of the half-dies 3, while the two remaining nippers are shown in an open condition, it being understood that the closed nippers are thus held by the action of their respectively-allotted springs, and that the open nippers are held positively in such condition by the cam I, along which the studs of the crank-arms belonging to such nippers are understood to be riding. The block which provides the curved guide 6 is also provided with a notch, 19, Figs. 4, 10, and 11, which notch forms in the lower end portion of the guide 6 a passage through which the outer ends, 12, of the nippers can pass during the rotation of the head E. This notch or passage 19 permits, therefore, the nippers in an open condition to pass the lower end of the guide, and at the same time allows the guide, which is formed substantially concentric to the head B and tangential to the head E, to be brought at its lower end as closely down to said head E as may be desired.

The blanks are headed up by movable dies K, which are carried by the rotary head E, and operated at proper intervals by an idler wheel or roll, L, Fig. 3, against which the stocks or butt-ends of such heading-dies are successively brought during the rotation of the head E. The heading-dies K correspond in number to the number of dies on the rotary head E, and are arranged at intervals around the latter, so that when a nail-blank is firmly gripped between two registering-dies, E' and F', the heading-die allotted to such gripping-dies will be forced forward by the opposition of the idler-wheel and caused to head up the blank. The heading-dies can be forced back by springs 20, Fig. 5, so that the butt-ends of their stocks or body portions may normally stand in a path intersected by the idler-wheel, thus insuring the action of the heading-dies at proper times.

The heading-dies are arranged to work in suitable guideways, which can be formed in an annular flange, 21, on the rotary head E, and in heading up a blank the die K, brought into action for such purpose, has a rectilinear forward movement in line with the blank to be headed. In this way the action of the heading-die will be square upon the end of the nail-blank, and will consequently insure the formation of a perfect head for the nail.

The idler wheel or roll L is adjustably stationed, so that it can be set with reference to the heading-dies and to the extent of forward throw to be given to such dies, a convenient mode of adjusting the position of such idler wheel or roll being shown in Fig. 3, wherein the sliding box or bearing 22 for such wheel has its back end made inclined and set against the inclined side of an adjusting-block, 23, which latter can be raised and lowered by a rod, 24, arranged to extend up through the box or bearing for the shaft of head B.

Each die E' is provided with a groove, 3, Fig. 9, which will in practice be adapted to slightly round up the blank adjacent to the nail-head. The dies E' are fitted to blocks or backing-pieces 23, Fig. 9, one of which said blocks or backing-pieces will be provided for each die 3. Each block 23 is properly recessed for the reception of its allotted die E', which is to be set in the block so as to bring the groove 3 of the die E' in alignment with a groove, 24, in one end of the block. These blocks 23 are set in mortises 25, that are formed radially in the head E, as in Fig. 14, and are detachably held in place by the screws 26, as shown in Fig. 6. The dies E', when fitted to the blocks 23, as in said Fig. 26, are backed by adjusting-screws 27, which have their bearings in a hub or collar, 28, set centrally within the head E, in which way the dies are capable of radial adjustment for the purpose of compensating for wear of their faces.

The grooves 3 of the dies E' constitute gripping or clamping die surfaces, which act in conjunction with like grooved faces of the dies F' for holding the blanks during the heading up of the same. The grooves of the dies E' and F' also serve for rounding up the blanks, and since such dies require frequent renewal of their acting faces they are made separate from the blocks 23 and provided with acting faces for receiving and rounding up that portion of the shank or body of the nail that is nearest to its head, the remaining portion of the nail-blank being to a desired extent received and held in the groove 24 in the block to which the die is fitted. The dies F' of the head F, Fig. 5, are combined with blocks 30, that are held in grooves 31 of the head by screws 32, and the dies F' are adjustably held by screws 33, all substantially in the same way that the half-dies and blocks of head E are arranged.

With regard to certain details of arrangement herein shown, it will be observed that while the rotary head B could be provided with but a single cutter it is desirable to provide it with a plurality of cutters, C, and also that while the heads E and F could be provided with but one die (in case but one cutter should be provided for the head B) it is desirable to equip each of said heads E and F with a plurality of dies, each head having a series of dies corresponding in number to the number of cutters C.

The cutters C herein shown are adjustably held in mortises formed on lines which may be regarded as the chords of certain arcs or segments about the center of the head, as illustrated in Figs. 4 and 10. This arrangement permits the ends of the cutter-blades to be ground with a bevel substantially concentric with the cylindric head, and further affords a convenient disposition of the cutter-blades, which can be adjusted by blocks 34, beveled as in Fig. 13, and set by adjusting-screws 35.

The arrangement of gearing for driving the three rotary heads B, E, and F may of course be varied, and hence no limitation is herein placed upon the means to be employed for operating these rotary heads. As one of such ways, the shaft 36 of the head B is driven from a power-shaft, 37, by means of a gear, 38, on the power-shaft engaging a gear, 39, on the shaft of said rotary head. The shaft 36 is also provided with a gear, 40, engaging a gear, 41, on the shaft 42 of the rotary head E, and serving to drive said shaft and head, and this said shaft 42 of the rotary head E is further provided with a gear, 43, for actuating the rotary head F through the medium of a gear, 44, fixed upon the shaft 45 of head F and engaging the said gear 43.

The three heads B, E, and F are all driven at the same rate of speed; but the head E is made somewhat greater in diameter than the head B, so that a die on the periphery of head E will be set from the axis of said head at a distance greater than that at which any one of the cutting-edges of cutters C is set from the axis of its allotted head B. This arrangement, while permitting a die on head E to be brought during each revolution into position for receiving a nail-blank from a particular cutter C, will cause the die to travel faster than the cutter; hence the instant a nail-blank is ejected from its position against the head B and engages in a die on the head E said die will carry the nail-blank rapidly ahead of the cutter, which follows with a slower movement, thereby avoiding any possibility of the cutter interfering with the nail-blank at such time.

The rotary head F is mounted in a self-adjustable bearing, E², herein shown arranged to slide in a guideway in the main frame and backed by a spring, E³. In connection with such spring any suitable means—such as an adjustable follower, E⁴—can be provided for regulating the force of the spring. Spring-backed bearings are old expedients in various other machines; but in the present instance such device involves novel and important results. Thus the spring can be regulated so that when two dies, respectively on the head E and the head F, are about to separate or pass a line joining the centers of the two heads, the action of the spring will serve to hold the die of head F up to the die of the head E a little longer than if the journal-bearing for head F were stationary. This causes a prolongation of the grip of the dies on the nail-blank, so that the heading-die can have ample time to complete the heading up of the nail-blank.

What I claim as my invention is—

1. In a nail-machine, the combination, substantially as hereinbefore set forth, of a pair of revolving opposing nail-blank-clamping dies and the nipper which is carried with one of the dies and arranged to engage and hold thereon a nail-blank both preparatory to the moment at which said die is brought into register with the opposing die and for a short period after it has passed the same, for the purpose described.

2. In a nail-machine, the combination, substantially as hereinbefore set forth, of a revolving die-head provided with a nail-blank-clamping die, the nipper mounted upon said revolving die-head, a spring acting to close the nipper upon the die during a portion of the complete revolution of the die-head, and a cam arranged and timed for opening the nipper to discharge the nail, and for holding open the nipper during the remaining portion of such revolution on the part of the head, for the purpose described.

3. In a nail-machine, the combination, with the rotary head provided with a clamping-die, of the vibratory nipper H, carried by the rotary head, a crank-arm, 14, on the pivot of the nipper, and the cam I, arranged and timed substantially as described, for alternately opening and closing the nipper, for the purpose specified.

4. In a nail-machine, the combination, substantially as hereinbefore set forth, of the rotary cutter-head provided with one or more cutters, a rotary die-head provided with one or more nail-blank-clamping dies, and a curved guideway formed between a curved wall and the cutter-head and extending from the point of cut to a point where it can deliver the nail-blank to a die upon the rotary head, the cutter or cutters of the rotary cutter-head and the die or dies of the rotary die-head being relatively arranged, whereby a nail-blank carried along the guideway by a cutter shall be delivered to a die upon the revolving die-head, for the purpose set forth.

5. In a nail-machine, the combination, substantially as described, with a rotary head provided with a cutter and a stationary cutter, of the guide 6 and a couple of rotary heads, each provided with a die, one of said die-carrying heads being arranged relatively to the delivery end of said guide to bring its die during each revolution at a point where a nail-blank can be discharged from said guide onto said die, substantially as described.

6. In a nail-machine, the combination, substantially as hereinbefore set forth, with a cutter for severing the nail-blanks and a rotary die-head provided with one or more nail-blank-clamping dies, of a guide, substantially as set forth, extending from the point of cut to the die-head and arranged for the delivery of a nail-blank to a die of the rotary die-head, a nipper mounted upon the rotary die-head, and a nipper-closing device timed relatively to the revolutions of the die-head and its die to close the nipper upon a nail-blank the instant such blank has been delivered from the said guide onto the die, for the purpose described.

7. In a nail-machine, the combination, with the recessed die-block 23, fitted in a die-head and provided with a face-groove, 24, of the clamping and rounding-up die E', adjustably held in said recessed block and arranged with its face-groove in alignment with the face-groove of the block, substantially as described.

8. In a nail-machine, the combination of the die-block 23, fitted in its allotted die-head and provided with a face-groove, 24, the clamping and rounding-up die adjustably held in said recessed block and having its face-groove in alignment with the face-groove of the block, and an opposing recessed die-block fitted in its allotted head and provided with a clamping and rounding-up die, F', adjustably held, said block, the die F', and its block 30 being grooved similar to the opposing die E' and block 23, substantially as and for the purpose described.

9. In a nail-machine, the combination, with a pair of revolving clamping-dies, of a movable heading-die carried with one of the revolving dies and an idler wheel or roll, L, constituting an abutment intersecting the path described by the rear portion of the heading-die, substantially as described.

10. In a nail-machine, the combination, with a rotary head provided with a clamping-die, of a heading-die, substantially as set forth, carried by said rotary head, and an idler-wheel, L, mounted in an adjustable bearing and intersecting the path described by a projecting portion of the heading-die, substantially as described.

11. In a nail-machine, the combination, with a rotary head provided with a cutter, of the rotary head E, provided with a die and made of greater diameter than the cutter-head, whereby the travel of the die shall be more rapid than the travel of the rotary cutter, substantially as and for the purpose set forth.

12. In a nail-machine, the rotary head B, provided with a cutter, C, and a spring-finger in front of such cutter, for the purpose set forth, of the guide 6 and the rotary head E, provided with a die which travels somewhat faster than the cutter, substantially as described.

13. In a nail-machine, the combination, with a revolving cutter, of the guide 6, provided with a passage, 19, at its lower end, and the rotary head provided with a die and with a nipper, which, preparatory to engaging and holding a nail upon said die, passes through the passage 19, substantially as described.

14. In a nail-machine, a pair of rotary heads, each provided with a die and arranged whereby said dies may during the conjoint revolution of the heads be brought into register, combined with a spring-backed bearing for one of said rotary heads, substantially as and for the purpose described.

15. In a nail-machine, the rotary head B, provided with a cutter, C, and a spring-controlled finger, 5, pivoted at one end upon a raised portion of the perimeter of the head, whereby said spring is pivotally supported relatively to the periphery of the head to avoid dragging forward the nail-blank when acting to discharge the same, substantially as described.

16. In a nail-machine, the combination, substantially as hereinbefore set forth, with the rotary cutter-head provided with a peripherally-projecting cutter, of a clamping-die upon which the nail-blank is to be received from the cutter, the curved guide extending from the point of cut to a point to deliver the nail-blank onto the clamping-die, and the pivoted nail-blank-ejector finger 5, pivotally hung at one end upon a projection raised from the periphery of the cutter-head, whereby in ejecting the nail-blank said ejecting-finger is prevented from dragging forward the nail-blank, substantially as described.

FRANK ALLISON.

Witnesses:
CHAS. G. PAGE,
MAX HAMBURGER.